(12) United States Patent
Taniguchi

(10) Patent No.: US 7,705,568 B2
(45) Date of Patent: Apr. 27, 2010

(54) POWER-GENERATOR CONTROL APPARATUS FOR ADDRESSING OCCURRENCE OF VOLTAGE TRANSIENT

(75) Inventor: Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 331 days.

(21) Appl. No.: 12/003,639

(22) Filed: Dec. 28, 2007

(65) Prior Publication Data
US 2008/0164852 A1    Jul. 10, 2008

(30) Foreign Application Priority Data
Jan. 5, 2007    (JP)    ............... 2007-000695

(51) Int. Cl.
*H02P 9/10*    (2006.01)
*H02P 9/14*    (2006.01)
*H02P 11/00*    (2006.01)
*H02H 7/06*    (2006.01)
*H02P 9/00*    (2006.01)

(52) U.S. Cl. ............... 322/59; 322/28; 322/29

(58) Field of Classification Search ............ 322/28, 322/29, 59
See application file for complete search history.

(56) References Cited

U.S. PATENT DOCUMENTS

| | | | |
|---|---|---|---|
| 4,087,736 A * | 5/1978 | Mori et al. ............ 322/28 |
| 4,401,937 A * | 8/1983 | Morishita ............ 322/28 |
| 4,459,489 A * | 7/1984 | Kirk et al. ............ 290/13 |
| 4,516,066 A | 5/1985 | Nowakowski ............ 320/123 |
| 4,629,967 A * | 12/1986 | Voss ............ 322/28 |
| 4,629,968 A * | 12/1986 | Butts et al. ............ 322/29 |
| 4,634,954 A * | 1/1987 | Kato et al. ............ 322/28 |
| 4,636,706 A * | 1/1987 | Bowman et al. ............ 322/28 |
| 4,682,044 A * | 7/1987 | Hotate et al. ............ 290/40 B |
| 4,727,307 A * | 2/1988 | Kaneyuki et al. ............ 322/22 |
| 4,739,243 A * | 4/1988 | Iwatani et al. ............ 322/10 |
| 4,739,245 A * | 4/1988 | Komurasaki et al. ............ 322/99 |
| 4,839,576 A * | 6/1989 | Kaneyuki et al. ............ 322/25 |
| 4,940,928 A * | 7/1990 | Nishimura ............ 322/28 |
| 5,059,886 A * | 10/1991 | Nishimura et al. ............ 322/28 |
| 5,144,220 A * | 9/1992 | Iwatani et al. ............ 322/28 |
| 5,214,371 A * | 5/1993 | Naidu ............ 322/29 |
| 5,231,344 A * | 7/1993 | Marumoto et al. ............ 322/14 |
| 5,266,882 A * | 11/1993 | Morishita ............ 322/28 |
| 5,719,484 A * | 2/1998 | Taniguchi et al. ............ 322/20 |
| 5,719,486 A * | 2/1998 | Taniguchi et al. ............ 322/28 |
| 5,719,487 A * | 2/1998 | Sato et al. ............ 322/28 |

(Continued)

FOREIGN PATENT DOCUMENTS

JP    2003-174799    6/2003

(Continued)

*Primary Examiner*—T C Patel
*Assistant Examiner*—Pedro J Cuevas
(74) *Attorney, Agent, or Firm*—Nixon & Vanderhye PC

(57) ABSTRACT

In a power-generator control apparatus, a control circuit intermittently controls the supply of a field current from a battery to a field winding of a power generator in normal mode so as to adjust power induced in an output winding of the power generator. The control circuit interrupts the supply of the field current from the battery to the field winding in transient mode when a transient voltage occurs. An energy absorbing circuit absorbs magnetic energy stored in the field winding independently of magnetic-energy consumption by a resistance of the field winding itself.

12 Claims, 11 Drawing Sheets

U.S. PATENT DOCUMENTS

| | | | |
|---|---|---|---|
| 6,555,993 B2* | 4/2003 | Taniguchi et al. | 322/28 |
| 6,621,251 B2* | 9/2003 | Ogino et al. | 322/28 |
| 6,664,767 B2* | 12/2003 | Takahashi et al. | 322/28 |
| 6,664,768 B2* | 12/2003 | Naidu et al. | 322/29 |
| 6,734,653 B2* | 5/2004 | Taniguchi et al. | 322/24 |
| 6,737,835 B2* | 5/2004 | Taniguchi | 322/29 |
| 6,756,770 B2* | 6/2004 | Watanabe et al. | 322/28 |
| 6,803,748 B2* | 10/2004 | Peter | 322/29 |
| 6,815,933 B2* | 11/2004 | Taniguchi et al. | 322/28 |
| 6,831,445 B2 | 12/2004 | Taniguchi | 322/28 |
| 7,071,656 B2* | 7/2006 | Taniguchi | 322/28 |
| 7,102,332 B1* | 9/2006 | Sasaki et al. | 322/28 |
| 7,106,028 B2* | 9/2006 | Iwatani | 322/28 |
| 7,119,519 B2 | 10/2006 | Taniguchi | 322/28 |
| 7,183,749 B2* | 2/2007 | Maehara | 322/22 |
| 7,199,559 B2* | 4/2007 | Yanagi | 322/33 |
| 7,253,591 B2* | 8/2007 | Takahashi | 322/59 |
| 2002/0021111 A1* | 2/2002 | Ogino et al. | 322/28 |
| 2002/0024314 A1* | 2/2002 | Takahashi et al. | 318/601 |
| 2002/0036484 A1* | 3/2002 | Taniguchi et al. | 322/28 |
| 2002/0043962 A1* | 4/2002 | Taniguchi et al. | 322/28 |
| 2002/0149347 A1* | 10/2002 | Asada | 322/28 |
| 2003/0062877 A1* | 4/2003 | Watanabe et al. | 322/28 |
| 2003/0107350 A1* | 6/2003 | Taniguchi | 322/28 |
| 2003/0178907 A1* | 9/2003 | Taniguchi | 310/180 |
| 2004/0145355 A1* | 7/2004 | Taniguchi | 322/29 |
| 2004/0150376 A1* | 8/2004 | Peter | 322/29 |
| 2004/0183505 A1* | 9/2004 | Taniguchi et al. | 322/28 |
| 2005/0258807 A1* | 11/2005 | Yanagi | 322/33 |
| 2006/0139012 A1* | 6/2006 | Iwatani et al. | 322/28 |
| 2008/0088282 A1* | 4/2008 | Inokuchi et al. | 322/28 |
| 2008/0284386 A1* | 11/2008 | Nishimura | 322/28 |

FOREIGN PATENT DOCUMENTS

JP  2004-056881  2/2004

* cited by examiner

POWER-GENERATOR CONTROL APPARATUS FOR ADDRESSING OCCURRENCE OF VOLTAGE TRANSIENT

CROSS REFERENCE TO RELATED APPLICATIONS

This application is based on Japanese Patent Application No. 2007-000695 filed on Jan. 5, 2007. The descriptions of the patent application are all incorporated herein by reference.

FIELD OF THE INVENTION

The present invention relates to a power-generator control apparatus designed to address an occurrence of rapid drop in a field current.

BACKGROUND OF THE INVENTION

In an alternator of a battery charging system installed in a motor vehicle, especially, an alternator whose field winding is to be energized by a battery of the battery charging system, such a transient voltage may occur in the event of a battery disconnect due to engine vibration or the event of the high power loading of the battery is rapidly damped or removed from the battery charging system. In this case, a field winding becomes substantially opened to generate a transient voltage in stator windings during a period in which a field current drops by a comparatively long time constant of, for example, several hundreds milliseconds. This generation of such a rapid drop in the field winding will be referred to as "load damp", and the transient voltage induced in the stator windings in the event of the load damp will be referred to as "load-damp voltage or load-damp surge voltage", hereinafter.

In order to reduce an adverse influence on vehicle auxiliaries and/or components installed in the alternator, three patent publications have been proposed.

The first patent publication (U.S. Pat. No. 6,831,445B2 corresponding to Japanese Patent Application Publication No. 2003-174799) discloses means for applying a reverse bias voltage to the field winding after excitation thereof to thereby expedite attenuation in the field current.

The second patent publication (U.S. Pat. No. 7,119,519B2 corresponding to Japanese Patent Application Publication No. 2004-56881) discloses means for generating such a reverse bias voltage based on the battery installed in the motor vehicle.

The third patent publication (U.S. Pat. No. 4,516,066) discloses means for increasing such a bias reverse voltage by a series-connected batteries.

Referring to FIG. 12, there is illustrated a field-current control circuit disclosed in the third patent publication.

In FIG. 12, reference character 1030 represents high-side diodes (upper-arm diodes). The upper arm diodes 1030 works to supply a field current to the field winding 1014 from stator windings (not shown).

In the field-current control circuit, when a field-current adjusting transistor 1044 is turned off as need arises, a flywheel current (field current) flows through a field winding 1014 in a direction indicated by a solid arrow illustrated in FIG. 12; this flywheel current allows series-connected batteries 1025 and 1026 to be charged. The sum of the voltages of the batteries 1025 and 1026 is applied as a reverse bias voltage to a field winding 1014 so that the field winding is accelerated in attenuation. Specifically, a terminal A at which the field current is output from the field winding 1014 is reversely biased by the sum of the voltages of the series-connected batteries 1025 and 1026; this allows the field winding 1014 to be demagnetized.

The structure of the field-current control circuit illustrated in FIG. 12 may have the following problem. The problem will be described hereinafter with reference to FIGS. 13 and 14. FIG. 13 is a timing chart schematically illustrating the waveform of the field current of the field winding 1014 when the field-current control circuit operates in a normal mode in which no load-damp voltage is generated. FIG. 14 is a graph schematically illustrating a relationship between average field current and duty (duty cycle) of the field-current adjusting transistor 1044 when the field-current control circuit operates in the normal mode.

During an excitation accelerating period $\tau 1$ for which the field-current adjusting transistor 1044 has been in on state, the field current flows in a direction indicated by a dashed arrow illustrated in FIG. 12. In contrast, during an excitation damping period $\tau 2$ for which the field-current adjusting transistor 1044 has been in off state, the field current flows in the direction indicated by the solid arrow illustrated in FIG. 12 so as to flow through the series-connected batteries 1026 and 1025.

Specifically, when the field-current control circuit illustrated in FIG. 12 is used in such an alternator of a battery charging system, during the excitation accelerating period $\tau 1$, the terminal A substantially becomes a ground potential, and during the excitation damping period $\tau 2$, the terminal A substantially becomes the sum of the voltages of the series-connected batteries 1025 and 1026.

This unbalance causes an increasing waveform of the field current during the excitation accelerating period $\tau 1$ based on the field-current control circuit illustrated in FIG. 12 to be different from that of the field current during the excitation accelerating period $\tau 1$ based on a normal field-current control circuit. Similarly, the unbalance causes a damping waveform of the field current during the excitation damping period $\tau 2$ based on the field-current control circuit illustrated in FIG. 12 to be different from that of the field current during the excitation damping period $\tau 2$ based on a normal field-current control circuit.

This results that the field-current control circuit illustrated in FIG. 12 may cause the relationship between the duty cycle of the field-current adjusting transistor 1044 and the field current to become nonlinear (see FIG. 14).

The output of the alternator is designed to be controlled by controlling the duty cycle of the field-current adjusting transistor 1044 so as to adjust the field current. For this reason, the nonlinearity of the relationship between the duty cycle of the field-current adjusting transistor 1044 and the field current may make it difficult to stably adjust the output of the alternator.

SUMMARY OF THE INVENTION

In view of the background, an object of at least one aspect of the present invention is to provide power-generator control systems, which are capable of rapidly demagnetizing a field winding when they operate in load-damp mode (transient mode) in which a transient voltage occurs and of stably controlling an output of a power generator when they operate in normal mode in which no transient voltages occur.

According to one aspect of the present invention, there is provided a power-generator control apparatus for controlling a field current supplied from a battery to a field winding of a power generator. The field current generates a magnetic field, and the magnetic field induces power in an output winding of the power generator. The power-generator control apparatus includes a control circuit configured to intermittently control the supply of the field current from the battery to the field winding in normal mode so as to adjust the power induced in the output winding of the power generator. The control circuit is configured to interrupt the supply of the field current from the battery to the field winding in transient mode when a transient voltage occurs. The power-generator control apparatus includes an energy absorbing circuit configured to absorb magnetic energy stored in the field winding independently of magnetic-energy consumption by a resistance of the field winding itself.

In a preferred embodiment of this one aspect, the control circuit includes a first switching circuit connected between a positive terminal of the battery and one end of the field winding and configured to be turned on and off in the normal mode. The first switching circuit is configured to be turned off in the transient mode. The energy absorbing circuit includes an electrical energy storage unit for storing therein electrical energy, and a second switching circuit for selectively connecting between the other end of the field winding and any one of a ground terminal and the electrical energy storage unit. The second switching circuit is configured to connect the other end of the field winding to the ground terminal in the normal mode and to connect the other end of the field winding to the electrical energy storage unit in the transient mode.

In a preferred embodiment of this one aspect, the first switching circuit includes a first transistor connected between the positive terminal of the battery and the one end of the field winding. The first transistor is configured to be turned on and off in the normal mode and configured to be turned off in the transient mode. The first switching circuit includes a first diode whose cathode is connected to the one end of the field winding and whose anode is grounded. The second switching circuit includes a second transistor connected between the other end of the field winding and the ground terminal. The second transistor is configured to be turned on in the normal mode and configured to be turned off in the transient mode. The second switching circuit includes a second diode whose cathode is connected to the electrical energy storage unit and whose anode is connected to the other end of the field winding.

In a preferred embodiment of this one aspect, the electrical energy storage unit comprises a capacitor.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
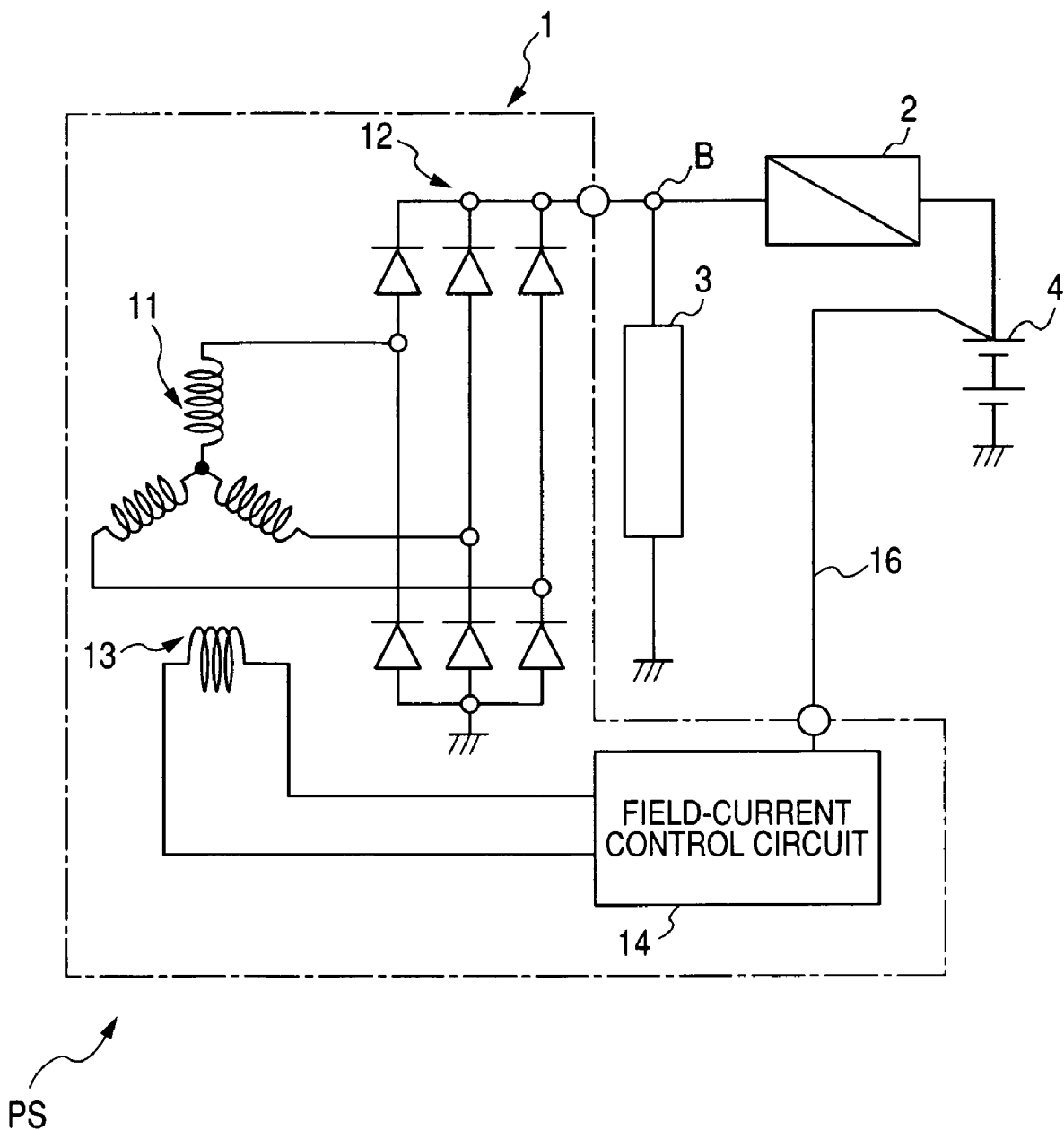
FIG. 1 is a circuit diagram schematically illustrating an example of the structure of a power supply system including an alternator according to a first embodiment of the present invention.

Referring to FIG. 1, there is provided a power supply system PS installed in, for example, a motor vehicle and equipped with a power-generator control apparatus according to a first embodiment of the present invention.

The power supply system PS includes an alternator 1 as an example of power-generators, a DC to DC converter 2, electrical loads 3, and an in-vehicle battery 4.

The alternator 1 has an output terminal B to which an input terminal of the DC to DC converter 2 is connected. An output terminal of the DC to DC converter 2 is connected to a positive terminal of the battery 4 whose negative terminal is grounded. The alternator 1 works to output a high DC voltage via the output terminal B.

The DC to DC converter 2 for example consists of:

a smoothing capacitor connected in parallel to the input terminal thereof for smoothing the DC voltage output from the alternator 1;

a first converter for converting the output DC voltage into an AC voltage;

a transformer for converting the AC voltage into an AC voltage whose level is different from the level of the AC voltage; and a second converter for converting the smoothed AC voltage into a DC voltage whose level is stepped down from the DC voltage output from the alternator 1. For example, the DC voltage output from the alternator 1 is stepped down by the DC to DC converter 2 to, for example, 12 V[volts]. The stepped-down DC voltage is supplied to the battery 4 so that the battery 4 is charged.

To the output terminal B, the electrical loads 3 installed in the motor vehicle and having high-power (high-voltage) requirements are connected. For example, the electrical loads 3 include a motor of an electronically-controlled power steering installed in the motor vehicle.

Specifically, the output DC voltage from the alternator 1 is supplied to the battery 4 via the DC to DC converter 2 to be charged therein, and supplied to the electrical loads 3.

The alternator 1 is equipped with a field winding 13 wound around a core of a rotor (not shown) to create field poles (north and south poles) alternately arranged when energized. The rotor is coupled to a crankshaft of an engine through a belt or the like to be rotatable therewith.

The alternator 1 is provided with three-phase stator windings 11 connected in, for example, star or delta configuration and wound around a stator core that surrounds the rotor.

The alternator 1 is provided with a three-phase full-wave rectifier 12 consisting of, for example, three pairs of positive (high-side) and negative (low-side) diodes connected in the form of a bridge. Specifically, the positive and negative diodes of each pair are connected in series at a connection point, and the connection points of the three-paired diodes are connected with lead wires of the three-phase stator windings 11, respectively.

The cathodes of the high-side diodes are commonly connected with the output terminal B of the alternator 1, and the anodes of the low-side diodes are commonly connected with a ground terminal of the alternator 1.

The alternator 1 is also provided with a field-current control circuit 14 connected to the field winding 13, and to the positive terminal of the battery 4 via a field current attenuation line 16.

In the alternator 1, when the field winding 13 is energized by the filed-current control circuit 14 while the rotor rotates, the rotating field winding 13 creates magnetic fluxes. The created magnetic fluxes magnetize the rotor core to provide the field poles.

The rotation of the filed poles creates magnetic fluxes, and the created magnetic fluxes induce a three-phase AC voltage in the three-phase stator windings 11. The three-phase full-wave rectifier 12 full-wave rectifies the induced three-phase AC voltage induced in the stator windings 11 to a direct current (DC) voltage. The full-wave rectified DC voltage is output through the output terminal B so that the output DC voltage is supplied to the battery 4 and the electrical loads 3.

Figure 2:
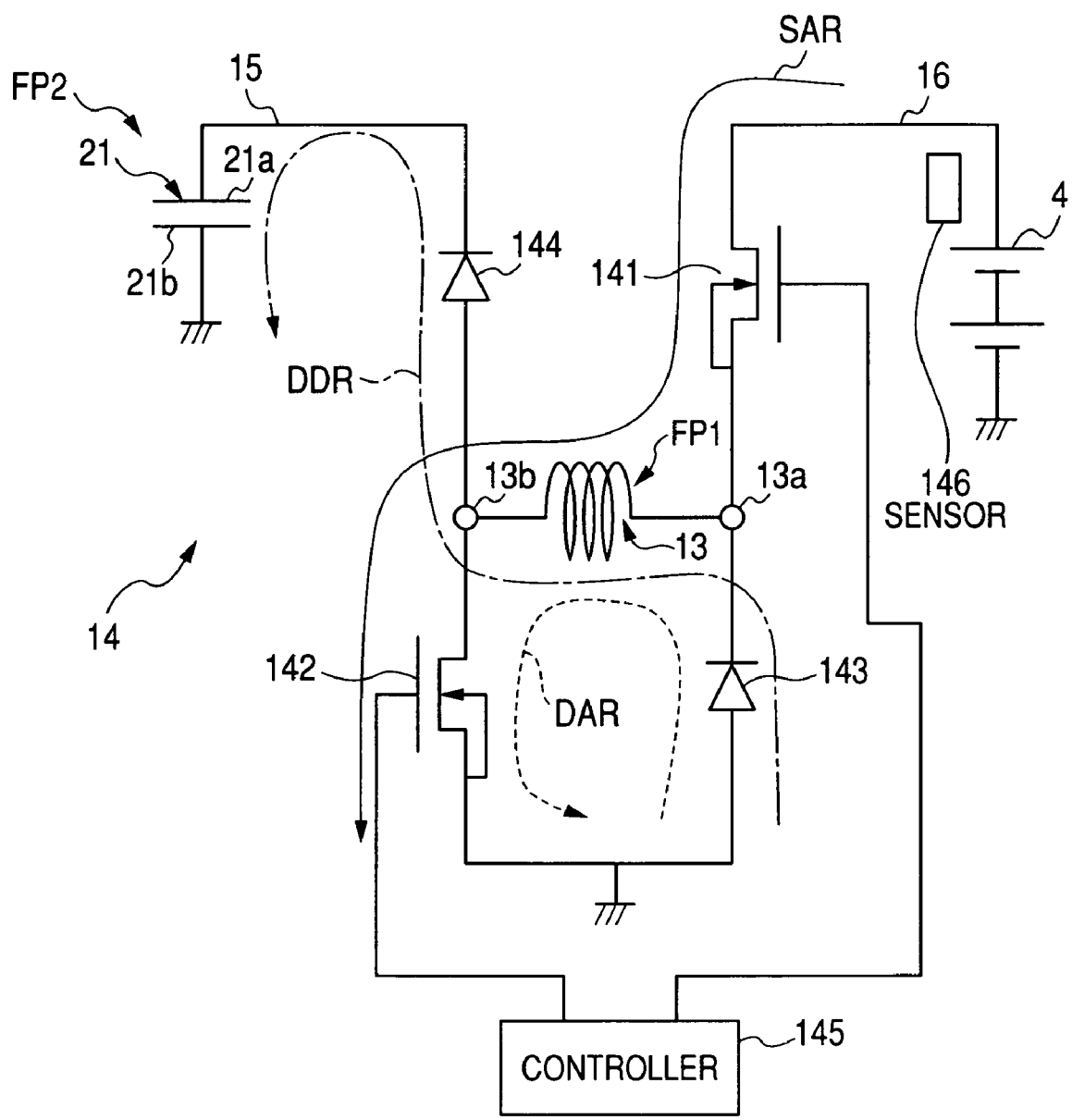
FIG. 2 is a circuit diagram schematically illustrating the structure of the field-current control circuit illustrated in FIG. 1.

FIG. 2 schematically illustrates the structure of the field-current control circuit 14.

As illustrated in FIG. 2, the field-current control circuit 14 is provided with a field-current adjusting transistor, such as NMOSFET, 141 a rapid disenergizing transistor, such as an NMOSFET, 142, a diode 143, a diode 144, a capacitor 21 with a predetermined or variable capacitance, a controller 145, and a sensor 146.

The field-current control circuit 14 is operative to control a field current to flow through the field winding 13 to thereby control the DC output voltage of the alternator 1.

The field-current control transistor 141, referred to simply as transistor 141, is connected between the positive terminal of the battery 4 and one end 13a of the field winding 13. Specifically, one end terminal, such as the drain, of the field-current control transistor 141 is connected to the positive terminal of the battery 4, and another end terminal, such as the source, thereof is connected to the one end 13a of the field winding 13.

The rapid disenergizing transistor 142, referred to simply as transistor 142, is connected between the other end 13b of the field winding 13 and the ground terminal of the alternator 1. Specifically, one end terminal, such as the drain, of the transistor 142 is connected to the other end 13b of the field winding 13, and another end terminal, such as the source, thereof is connected to the ground terminal of the alternator 1.

A cathode of the diode 143 is connected to the one end 13a of the field winding 13, and the anode thereof is connected to the ground terminal of the alternator 1.

A cathode of the diode 144 is connected to one electrode 21a of the capacitor 21 via a field current attenuation line 15, and the anode thereof is connected to the other end 13b of the field winding 13. The other electrode 21b of the capacitor 21 is connected to the ground terminal of the alternator 1.

A control terminal of the transistor 141, such as the gate thereof, is connected to the controller 145, and a control terminal of the transistor 142 is connected to the controller 145.

The sensor 146 is arranged to monitor the output level of the DC voltage of the battery 4 and to send, to the controller 145, a monitor signal indicative of the output level of the DC voltage of the battery 4.

When the controller 145 sends a drive signal to the transistor 141 to turn it on, the battery voltage (the potential at the positive terminal of the battery 4) is applied to the one end 13a of the field winding 13. When the controller 145 sends a drive signal to the transistor 141 to turn it off, the positive terminal of the battery 4 is connected to the ground terminal of the alternator 1 via the diode 143.

When the controller 145 sends a drive signal to the transistor 142 to turn it on, the other end 13b of the field winding 13 is connected to the ground terminal of the alternator 1 via the transistor 142. When the controller 145 sends a drive signal to the transistor 142 to turn it off, the other end 13b of the field winding 13 is connected to the one electrode 21a of the capacitor 21 via the diode 144.

The capacitance of the capacitor 21 is determined to be capable of storing an electrostatic energy higher than a value corresponding to the maximum magnetic energy storable in the field winding 13, more preferably, an electrostatic energy higher than a value corresponding to the voltage of the battery 4.

Operations of the field-current control circuit 14 in normal mode in which no transient voltages occur will be described hereinafter.

In the normal mode, the controller 145 drives the transistor 142 to continuously turn it on, and the controller 145 drives the transistor 141 to repetitively turn it on and off based on a predetermined duty (duty cycle) required to adjust the output DC voltage of the alternator 1.

During the transistor 141 being in on state, a field current flows from the positive terminal of the battery 4 to the transistor 142 via the transistor 141 and the field winding 13; this field current is indicated by a solid arrow SAR illustrated in FIG. 2.

This results that magnetic energy is charged in the filed winding 13.

In contrast, during the transistor 141 being in off state, the magnetic energy charged in the field winding 13 serves as a first power source FP1 in which the other end 13b of the field winding 13 becomes a positive terminal and the one end 13a thereof becomes a negative terminal.

Thus, a flywheel current based on the power source (magnetic energy stored in the field winding 13) circularly flows among the diode 143, the field winding 13, the transistor 142, and the ground terminal in a direction indicated by a dashed arrow DAR illustrated in FIG. 2; this results that the magnetic energy charged in the field winding 13 is decayed.

In other words, during the transistor 141 being in off state, a closed circuit composed of the field winding 13, the diode 143, and the on-state transistor 142 constitutes a DC circuit with an inductance of the field winding 13 and a resistance thereof.

Figure 3:
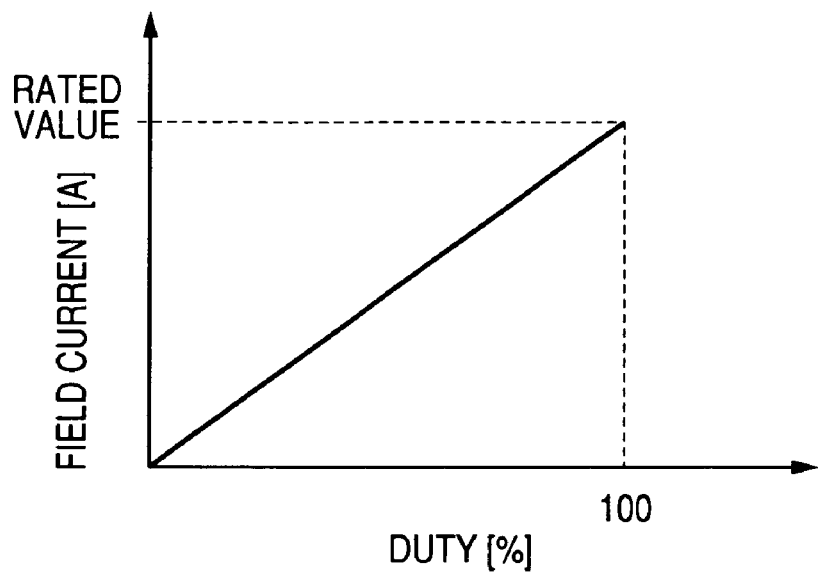
FIG. 3 is a graph schematically illustrating a relationship between average field current and duty cycle of a field-current control transistor illustrated in FIG. 2 when the field-current control circuit operates in normal mode according to the first embodiment.

FIG. 3 is a graph schematically illustrating a relationship between average field current and duty (duty cycle) of the transistor 141 when the field-current control circuit 14 operates in the normal mode. Note that the duty cycle is defined by the following equation:

$$D=\tau 1/(\tau 1+\tau 2)$$

where D represents the duty cycle, τ1 represents an ON duration of the transistor 141, and τ2 represents an OFF duration of the transistor 141.

Figure 4:
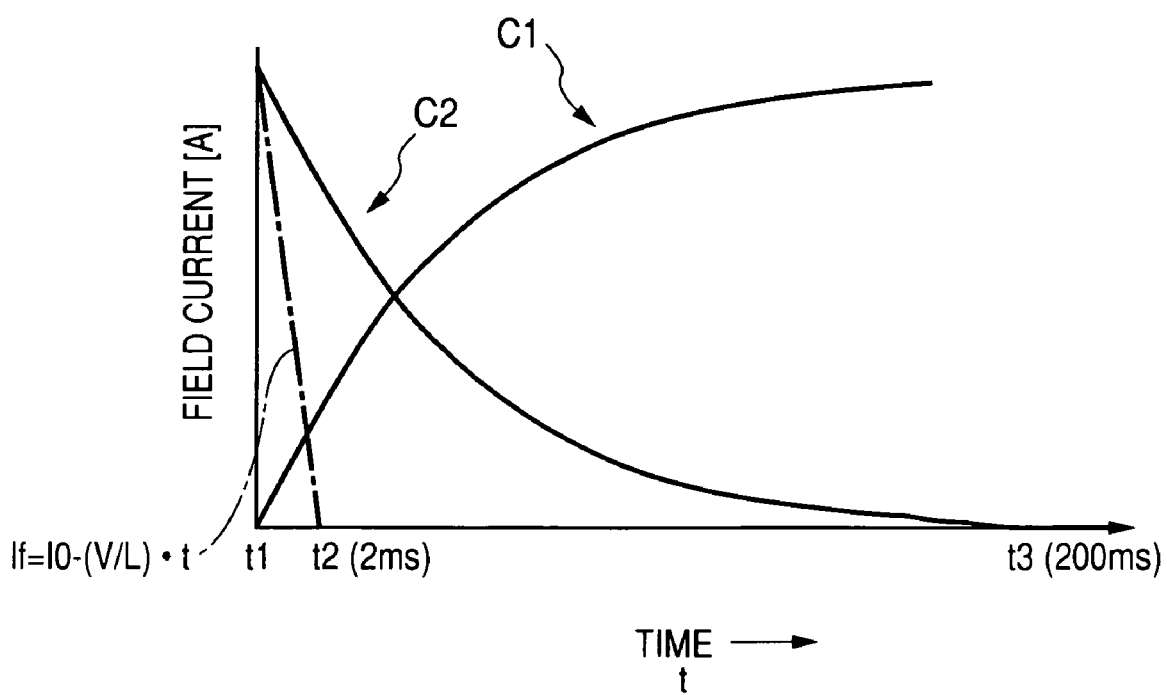
FIG. 4 is a timing chart schematically illustrating the waveform of the field current of a field winding illustrated in FIG. 1 when the field-current control circuit operates in the normal mode according to the first embodiment.

Specifically, the waveform of the field current for the ON duration of the transistor 141 has a substantially increased curve C1 commonly defined by a time constant of L/R (see FIG. 4); L represents the inductance of the field winding 13, and R represents the resistance thereof.

Similarly, the waveform of the field current for the OFF duration of the transistor 141 has a substantially decayed curve C2 close to a linear curve by the time constant L/R; this decayed curve is commonly defined by the time constant of L/R (see FIG. 4).

This allows the duty ratio D of the transistor 141 to become linear (see FIG. 3).

As described above, in the field-current control circuit 14 operating in the normal mode, adjustment of the duty ratio of the transistor 141 allows a desired amount of magnetic flux to be created in the stator windings 11; this duty ratio has a linear curve illustrated in FIG. 3.

Figure 14:
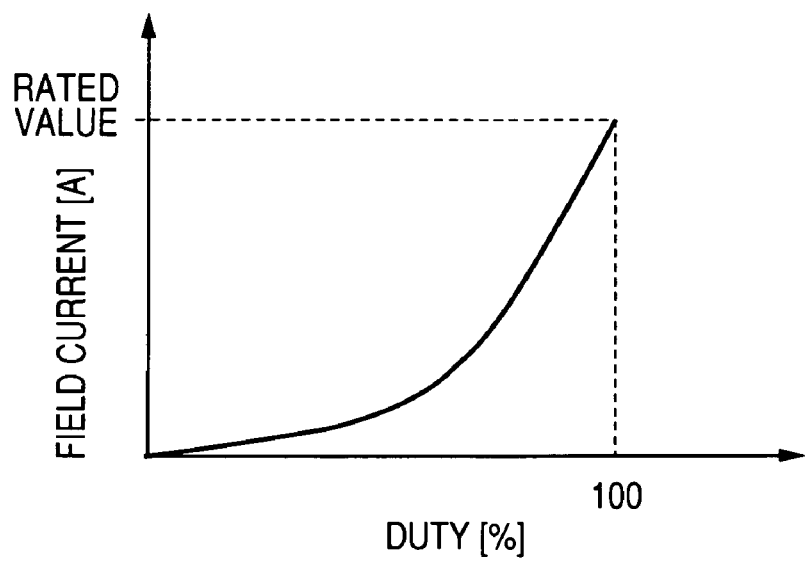
FIG. 14 is a graph schematically illustrating a relationship between average field current and duty (duty cycle) of a field-current adjusting transistor illustrated in FIG. 12 when the field-current control circuit operates in the normal mode.

As compared with the field-current control circuit disclosed in the third patent publication and having the nonlinear duty-ratio curve illustrated in FIG. 14, the field-current control circuit 14 having the linear duty-ration curve makes it possible to stably adjust the output of the alternator 1.

Specifically, the nonlinearity of the relationship between the duty cycle of the field-current adjusting transistor and the field current illustrated in FIG. 14 may apply an excessive amount of magnetic flux to the stator windings 11; this may result that an excessive DC voltage is output from the alternator 1. In addition, the nonlinearity of the relationship between the duty cycle of the field-current adjusting transistor and the field current illustrated in FIG. 14 may apply an insufficient amount of magnetic flux to the stator windings 11; this may result that an insufficient DC voltage is output from the alternator 1.

In contrast, in the first embodiment, it is possible to prevent such unstable alternator's output control due to the nonlinearity of the duty ration of the transistor 141.

Next, operations of the field-current control circuit 14 in load-damp mode in which a transient voltage occurs will be described hereinafter.

It is assumed that a transient voltage occurs at a time t=t1 (see FIG. 4).

Specifically, before the time t=t1, the duty cycle of the transistor 141 has been repetitively controlled while the transistor 142 is kept on in the normal mode. This allows the output DC voltage of the alternator 1 to be adjusted to a predetermined rated value of, for example, 42 V.

When the time t=t1, in the event of a disconnect between the alternator 1 and the battery 4 due to, for example, engine vibration or the event of the high power loading of the battery 4 is rapidly damped or removed from the power supply system PS, the field winding becomes substantially opened. This results that a transient voltage is generated in the stator windings 11 so that the output DC voltage of the alternator 1 rapidly increases.

Because the monitor signal is continuously sent from the sensor 146 to the controller 145, the controller 145 detects the rapid increase in the output DC voltage of the alternator 1, thus rapidly driving each of the transistors 141 and 142 to turn it off and keeping its off state. This allows the power supply from the battery 4 to the field winding 13 to be interrupted.

The turning-off of each of the transistors 141 and 142 allows a field current based on the magnetic energy stored in the field winding 13 to flow therefrom to the one electrode 21a of the capacitor 21 via the diode 144 in a direction indicated by a dashed-dotted arrow DDR illustrated in FIG. 2 so that the capacitor 21 is charged.

The electrostatic energy stored in the capacitor 21 serves as a second power source FP2 in which the one electrode 21a of the capacitor 21 becomes a positive terminal and the other electrode 21b thereof becomes a negative terminal.

The more the capacitor 21 is charged, the more rapidly the field current flowing in the direction indicated by the arrow DDR is attenuated because the magnetic energy stored in the field winding 13 is distributedly absorbed by both the resistance R thereof and the electrostatic energy stored in the capacitor 21.

For example, the field current flowing in the direction indicated by the arrow DDR is represented by "i", and the capacitance of the capacitor 21 is represented by "C", the energy distribution is represented by the following equation:

$$(\tfrac{1}{2})\times L\times i\times i = R\times i\times i + (\tfrac{1}{2})\times C\times i\times i$$

Specifically, because the field current is rapidly attenuated, it is possible to immediately demagnetize the field winding 13 even if a transient voltage occurs, thus rapidly attenuating a load-damp voltage to be created in the stator windings 11 due to the transient voltage.

For example, an instantaneous value If of the field current immediately after the transient voltage occurs (after the time t=t1) is represented by the following equation:

$$If \approx I0 - (V/L) \times t$$

where t represents an elapsed time (damping time) since the occurrence (detection) of the transient voltage, I0 represents a value of the field current at the moment of the occurrence (detection) of the transient voltage, and V represents a charged voltage across the one and the other electrodes 21a and 21b of the capacitor 21.

Specifically, as illustrated in FIG. 4, the field current If after the time t=t1 is rapidly reduced by the steep gradient of "V/L". For example, when the time t=t2 of 2 milliseconds [msec], the field current If is attenuated to substantially become zero.

In contrast, when no capacitors are provided to be connected to the other end 13b of the field winding 13, the field current If is gradually attenuated by the time constant L/R illustrated as the curve C2 in FIG. 4. For this reason, when the time t=t3 of 200 milliseconds [msec], the field current If is attenuated to substantially become zero.

As described above, in the power supply system PS according to the first embodiment, it is possible to improve the rapid demagnetizing performance of the alternator 1 (power supply system PS) substantially one hundred times as much as a conventional alternator in which its field winding is demagnetized by a time constant of L/R; this L represents the resistance of the field winding and R represents the resistance thereof.

Second Embodiment

Figure 5:
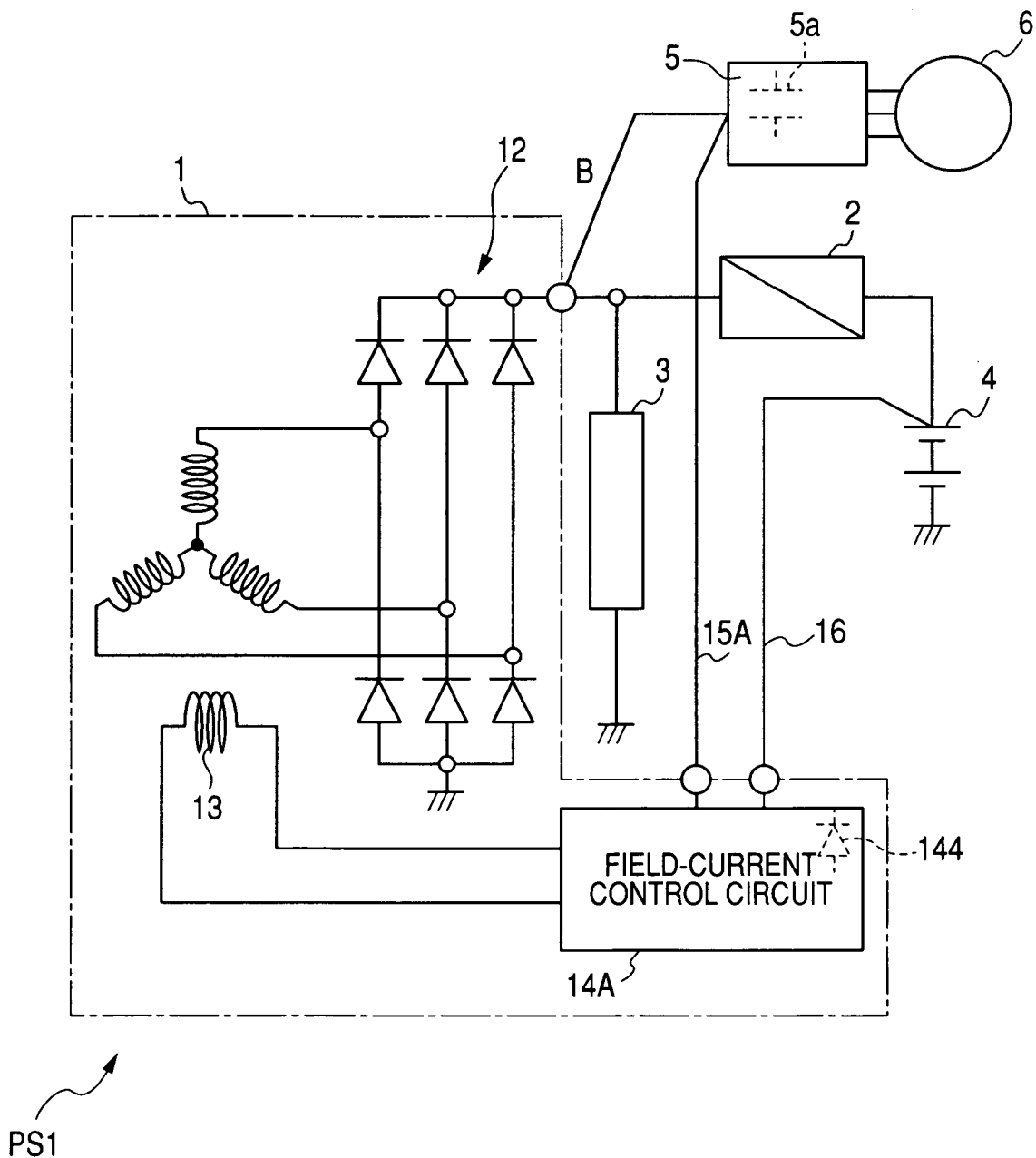
FIG. 5 is a circuit diagram schematically illustrating an example of the structure of a power supply system according to a second embodiment of the present invention.

FIG. 5 is a circuit diagram schematically illustrating the structure of a power supply system PS1 according to a second embodiment of the present invention. Like parts between the first and second embodiments, to which like reference characters are assigned, are omitted or simplified in description.

As illustrated in FIG. 5, the power supply system PS1 includes a three-phase brushless motor 6, and a three-phase inverter 5 having an input terminal connected to the output terminal B of the alternator 1 and having three-phase output lines connected to the three-phase brushless motor 6.

The three-phase inverter 5 works to receive the DC voltage output from the alternator 1, smooth the received DC voltage by a smoothing capacitor 5a connected in parallel to the input terminal thereof, convert the smoothed DC voltage into a three-phase AC voltage, and to supply the converted three-phase AC voltage to the three-phase brushless motor 6.

The capacitance of the smoothing capacitor 5a is determined to be comparatively high; this capacitance allows storage of an electrostatic energy higher than a value corresponding to the maximum magnetic energy storable in the field winding 13.

In the second embodiment, the capacitor 21 can be omitted from a field-current control circuit 14A of the alternator 1. Specifically, the cathode of the diode 144 is connected to the input terminal of the three-phase inverter 5 via a field current attenuation line 15A.

In the structure of the power supply system PS1, in the event of, for example, a disconnect between the alternator 1 and the battery 4, the transistors 141 and 142 are respectively turned off so that the field current flows through the diode 144 and the field current attenuation line 15A to the three-phase inverter 5. This allows the smoothing capacitor 5a to be charged like the capacitor 21 according to the first embodiment.

If the three-phase inverter 5 is operated, part of the field current is supplied to the three-phase brushless motor 6, and the remaining of the field current charges the smoothing capacitor 5a.

As in the case of the first embodiment, the more the smoothing capacitor 5a is charged, the more rapidly the field current flowing into the capacitor 5a through the field current attenuation line 15A is attenuated because the magnetic energy stored in the field winding 13 is distributedly absorbed by both the resistance R thereof and the electrostatic energy stored in the smoothing capacitor 5a.

Because the field current is rapidly attenuated, it is possible to immediately demagnetize the field winding 13 even if a transient voltage occurs, thus rapidly attenuating a load-damp voltage to be created in the stator windings 11 due to the transient voltage.

Third Embodiment

Figure 6:
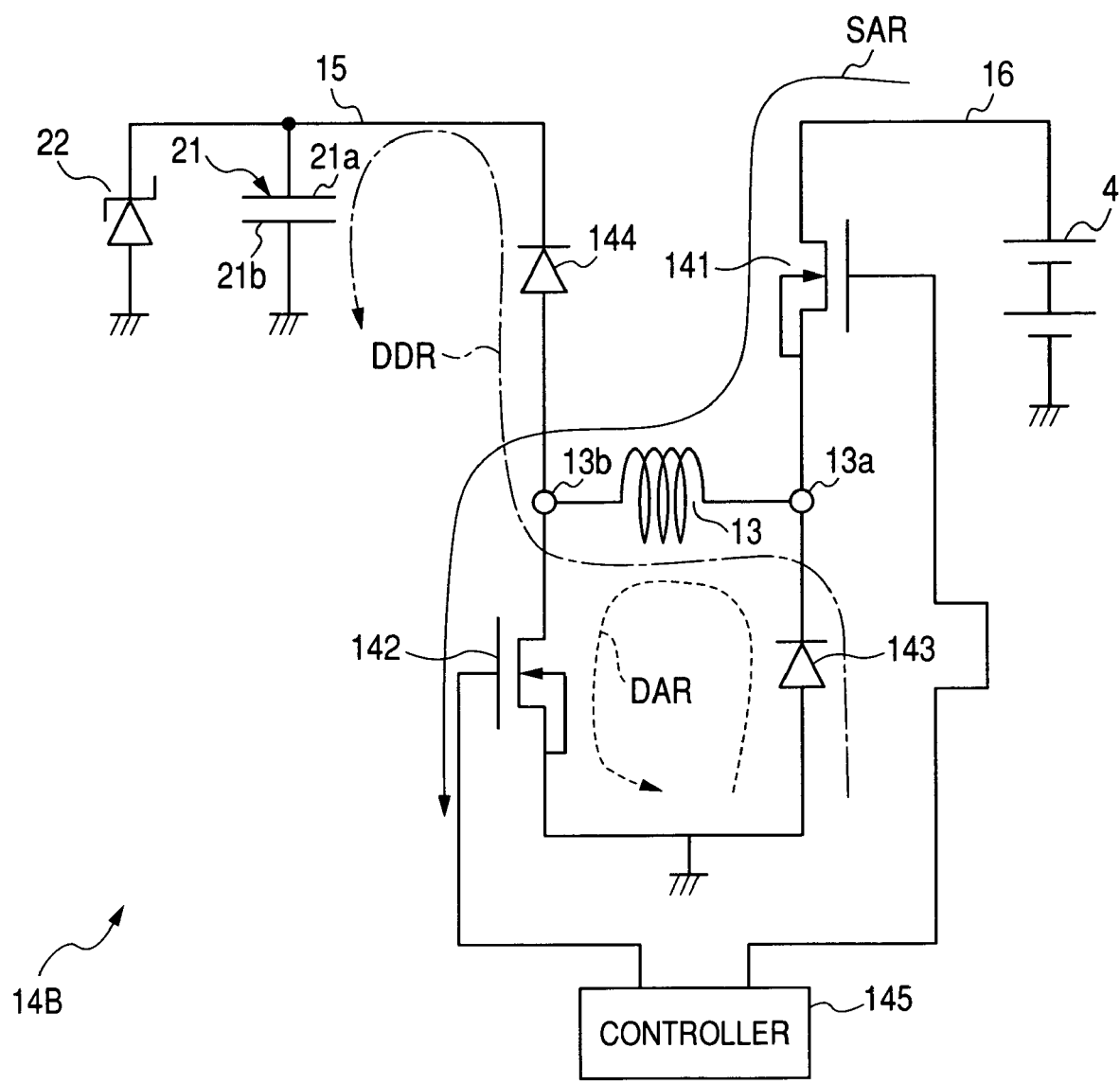
FIG. 6 is a circuit diagram schematically illustrating the structure of a field-current control circuit according to a third embodiment of the present invention.

FIG. 6 is a circuit diagram schematically illustrating the structure of a field-current control circuit according to a third embodiment of the present invention. Like parts between the first and third embodiments, to which like reference characters are assigned, are omitted or simplified in description.

As illustrated in FIG. 6, a field-current control circuit 14B is provided with a constant voltage diode 22 connected to the field current attenuation line 15 in parallel to the capacitor 21.

The constant voltage diode 22 allows the upper limit of the charged voltage in the capacitor 21 to be determined to a constant threshold voltage Vz of the constant voltage diode 22.

Because increase in the charged voltage in the capacitor 21 is restricted to be equal to or lower than the upper limit, it is possible to reduce a rated voltage of the capacitor 21.

In addition, in the third embodiment, the damping time t is represented by the following equation:

$$If \approx I0 - (Vz/L) \times t$$

Freely adjustment of the constant threshold voltage Vz allows the damping time t to be desirably determined.

As the constant voltage diode 22, various types of constant voltage diodes, such as zener diode, can be used.

Fourth Embodiment

Figure 7:
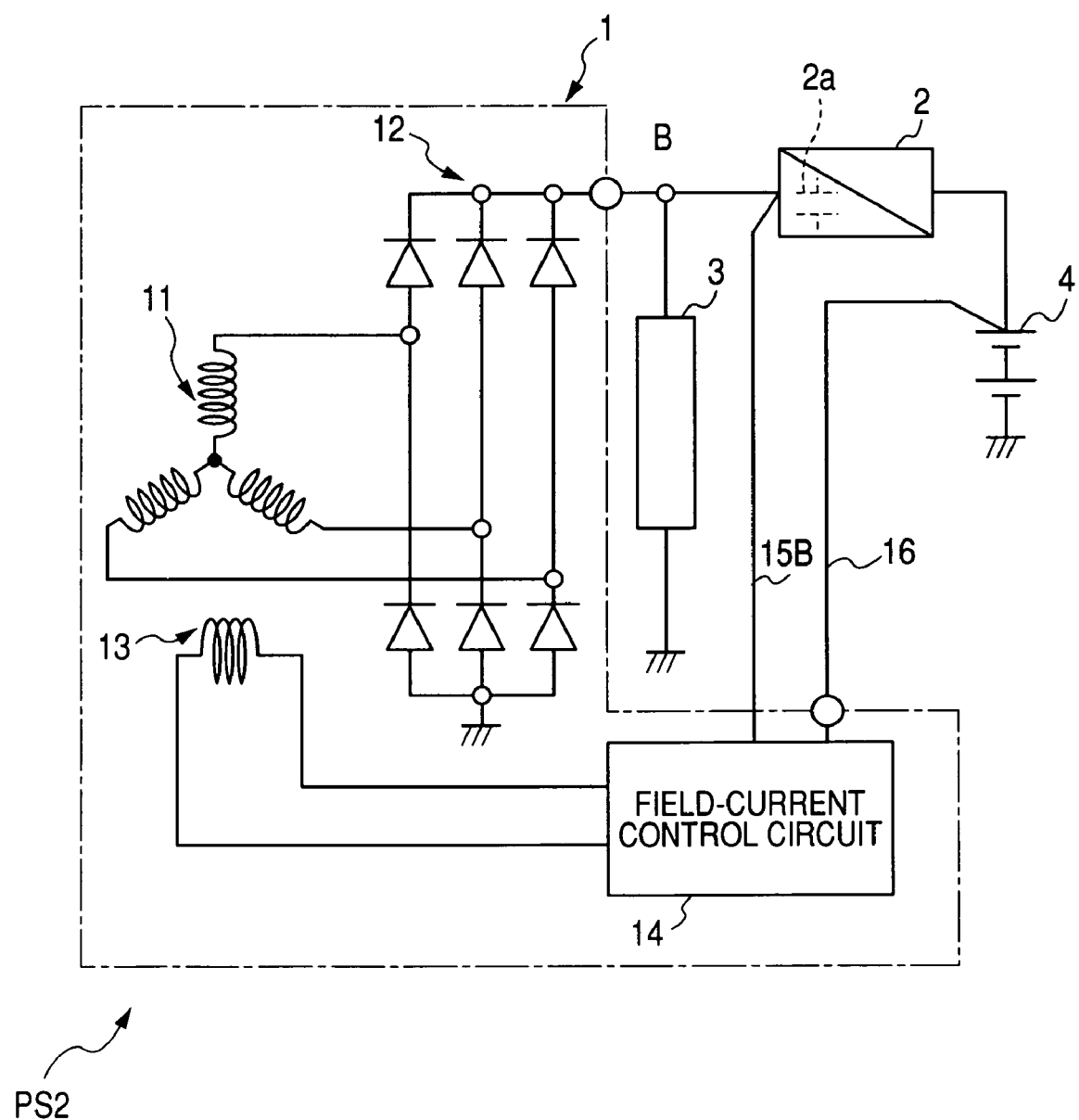
FIG. 7 is a circuit diagram schematically illustrating the structure of a power supply system according to a fourth embodiment of the present invention.

FIG. 7 is a circuit diagram schematically illustrating the structure of a power supply system PS2 according to a fourth embodiment of the present invention. Like parts between the first and fourth embodiments, to which like reference characters are assigned, are omitted or simplified in description.

As illustrated in FIG. 7 the power supply system PS2 includes a field current attenuation line 15B connected to the input terminal of the DC to DC converter 2.

In the fourth embodiment, the capacitor 21 can be omitted from a field-current control circuit 14B of the alternator 1. Specifically, the cathode of the diode 144 is connected to the field current attenuation line 15B so as to be connected to the input terminal of the DC to DC converter 2.

In the structure of the power supply system PS2, in the event of, for example, a disconnect between the alternator 1 and the battery 4, the transistors 141 and 142 are respectively turned off so that the field current flows through the diode 144 and the field current attenuation line 15B to the DC to DC converter 2. This allows the smoothing capacitor 2a of the DC to DC converter 2 to be charged like the capacitor 21 according to the first embodiment.

As in the case of the first embodiment, the more the smoothing capacitor 2a is charged, the more rapidly the field current flowing into the capacitor 2a through the field current attenuation line 15B is attenuated because the magnetic energy stored in the field winding 13 is distributedly absorbed by both the resistance R thereof and the electrostatic energy stored in the smoothing capacitor 2a.

Because the field current is rapidly attenuated, it is possible to immediately demagnetize the field winding 13 even if a transient voltage occurs, thus rapidly attenuating a load-damp voltage to be created in the stator windings 11 due to the transient voltage.

Fifth Embodiment

Figure 8:
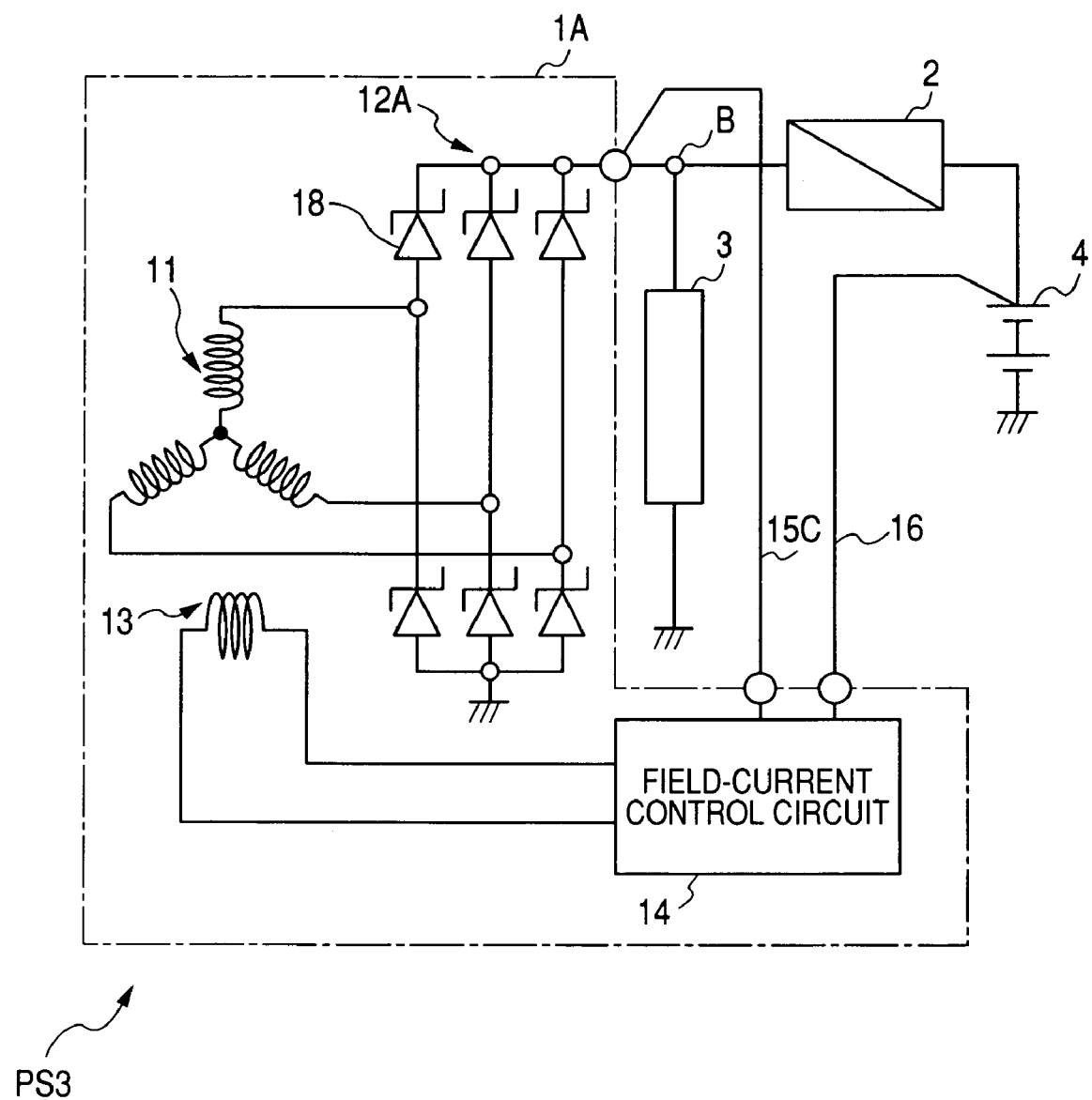
FIG. 8 is a circuit diagram schematically illustrating the structure of a power supply system according to a fifth embodiment of the present invention.

FIG. 8 is a circuit diagram schematically illustrating the structure of a power supply system PS3 according to a fifth embodiment of the present invention. Like parts between the first and fifth embodiments, to which like reference characters are assigned, are omitted or simplified in description.

As illustrated in FIG. 8, a three-phase full-wave rectifier 12A of an alternator 1A of the power supply system PS3 consists of three pairs of positive (high-side) and negative (low-side) constant voltage diodes 18 connected in the form of a bridge. Specifically, the positive and negative constant voltage diodes 18 of each pair are connected in series at a connection point, and the connection points of the three-paired constant voltage diodes 18 are connected with lead wires of the three-phase stator windings 11, respectively.

Specifically, as illustrated in FIG. 8, the smoothing capacitor 2a of the DC to DC converter 2 connected in parallel to the input terminal thereof is connected in parallel to the high-side constant voltage diodes 18 of the three-phase full-wave rectifier 12A. The capacitance of the smoothing capacitor 2a is determined to be comparatively high; this capacitance allows storage of an electrostatic energy higher than a value corresponding to the maximum magnetic energy storable in the field winding 13.

In addition, a field current attenuation line 15C connected to the diode 144 and the capacitor 21 is connected to the output terminal B of the alternator 1A.

In the structure of the power supply system PS3, in the event of, for example, a disconnect between the alternator 1 and the battery 4, the transistors 141 and 142 are respectively turned off. This allows the field current to flow through the diode 144 to the capacitor 21, and flow through the diode 144, the field current attenuation line 15C, and the output terminal B to each of the constant voltage diodes 18.

When a reverse breakdown voltage based on the field current is applied to each of the constant voltage diodes 18, each of the constant voltage diodes 18 is broken down. This results that the field current is returned to flow into the stator windings 11 of the alternator 1A.

Specifically, in the fifth embodiment, the field current flows to both the smoothing capacitor 2a and the stator windings 11 via the constant-voltage diode bridge. This makes it possible to reduce the increase in the potential of the positive electrode of the smoothing capacitor 2a.

Sixth Embodiment

Figure 9:
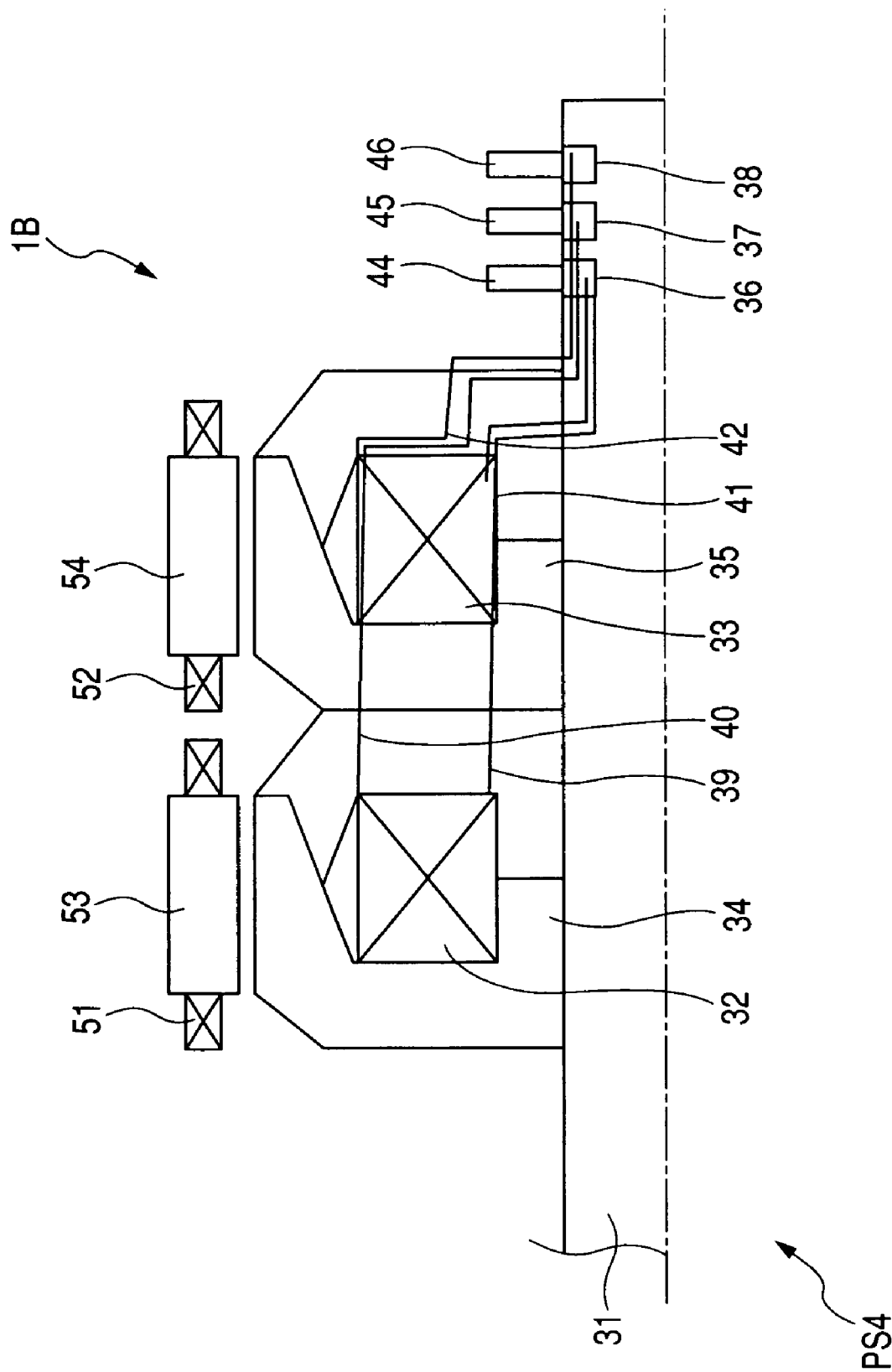
FIG. 9 is an axial cross sectional view of an alternator of a power supply system according to a sixth embodiment of the present invention.

FIG. 9 is an axial cross sectional view of an alternator 1B of a power supply system PS4 according to a sixth embodiment of the present invention. Like parts between the first and sixth embodiments, to which like reference characters are assigned, are omitted or simplified in description.

As illustrated in FIG. 9, the alternator 1B according to the sixth embodiment is designed as a tandem alternator.

The tandem alternator 1B is provided with a common rotary shaft 31, and first and second magnetic-field cores 34 and 35. Each of the first and second magnetic-field cores 34 and 35 has a substantially annular cylindrical shape. The rotary shaft 31 is arranged to be fitted into the inner peripheries of the first and second magnetic-field cores 34 and 35.

The tandem alternator 1B is provided with a first field winding 32 and a second field winding 33. The first magnetic-field core 34 has a substantially annular cylindrical space around the rotary shaft 31 in which the first field winding 32 is installed in the annular cylindrical space of the first magnetic-field core 32 to be wound around the rotary shaft 31. Similarly, the second magnetic-field core 35 has a substantially annular cylindrical space around the rotary shaft 31 in which the second field winding 33 is installed in the annular cylindrical space of the second magnetic-field core 35 to be wound around the rotary shaft 31.

Specifically, the first and second field windings 31 and 32 are aligned in an axial direction of the first and second magnetic-field cores 34 and 35.

One end 39 of the first field winding 32 and one end 41 of the second field winding 33 are connected to a first slip ring 36 fixedly mounted on the rotary shaft 31. The other end 40 of the first field winding 32 and the other end 42 of the second field winding 33 are connected to second and third slip rings 37 and 38, respectively. The second and third slip rings 37 and 38 are fixedly mounted on the rotary shaft 31 such that the first to third slip rings 36 to 38 are aligned in the axial direction of the rotary shaft 31.

The first, second, and third slip rings 36, 37, and 38 are arranged to be individually in contact with a first brush 44, a second brush 45, and a third brush 46, respectively. The first to third blushes 44 to 46 are fixed to a housing (not shown) of the tandem alternator 1B.

The tandem alternator 1B is provided with first and second armature cores 53 and 54 each with a substantially annular cylindrical shape. The first armature core 53 is so fixedly mounted on the housing as to surround the outer periphery of the first magnetic-field core 34 with a gap therebetween. Similarly, the second armature core 54 is so fixedly mounted on the housing as to surround the outer periphery of the second magnetic-field core 35 with a gap therebetween.

The tandem alternator 1B is provided with a first armature winding 51 and a second armature winding 52. The first armature winding 51 is installed in the first armature core 53, and the second armature winding 52 is installed in the second armature core 54.

The common rotary shaft 31, the first field winding 32, the first magnetic-field core 34, the first armature winding 51, and the first armature core 53 constitute a first high-voltage power-generating unit G1. The common rotary shaft 31, the second field winding 33, the second magnetic-field core 35, the second armature winding 52, and the second armature core 54 constitute a second low-voltage power-generating unit G2.

The power supply system PS4 includes a field-current control circuit 14B according to the sixth embodiment.

The field-current control circuit 14B works to supply a field current to each of the first and second field windings 32 and 33.

Figure 10:
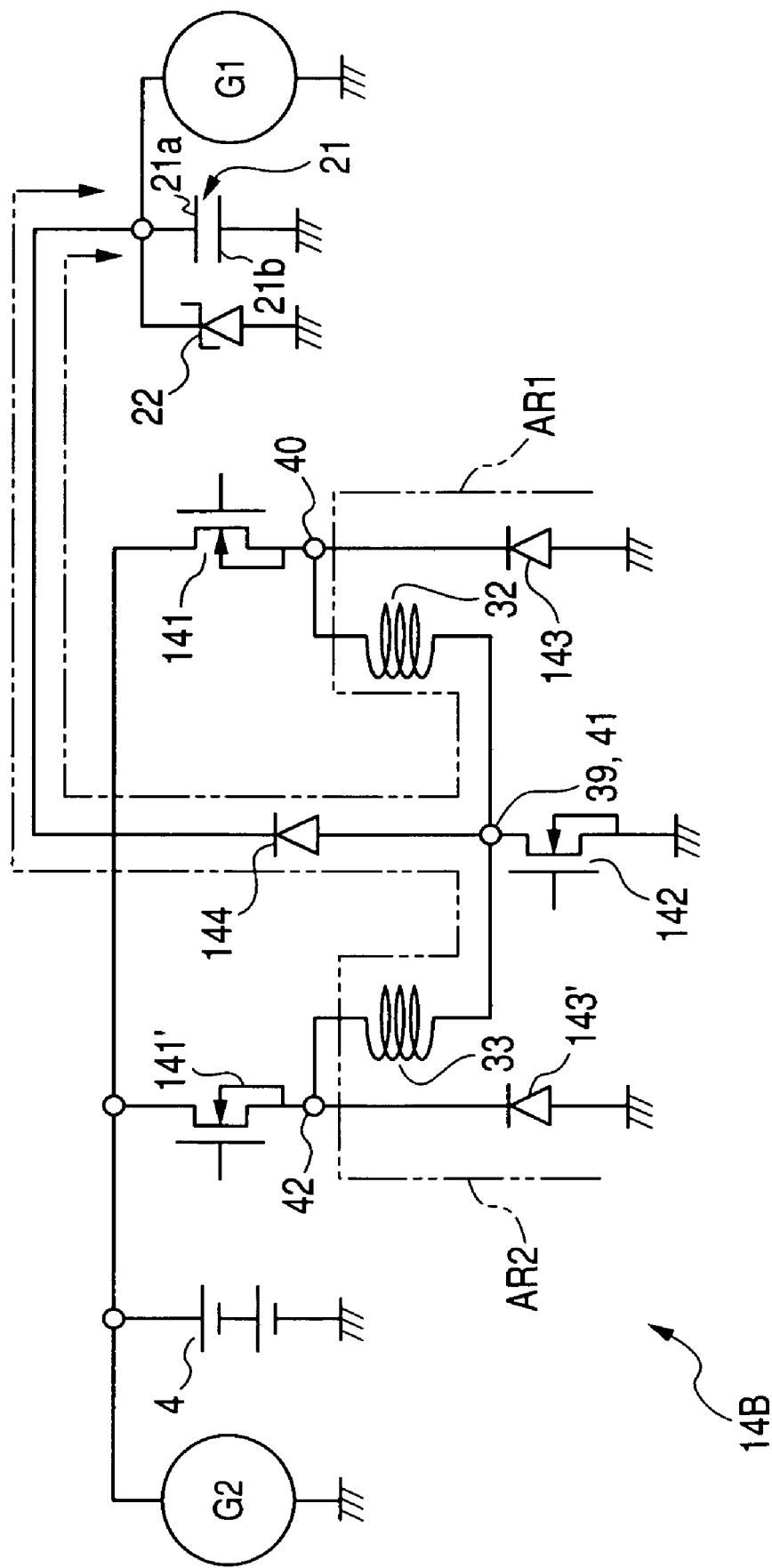
FIG. 10 is a circuit diagram schematically illustrating the structure of a field-current control circuit according to the sixth embodiment.

Specifically, as illustrated in FIG. 10, the one ends 39 and 41 of the respective first and second field windings 32 and 33 commonly connected to the first slip ring 36, are connected to the ground terminal of the alternator 1B via the transistor 142. The one ends 39 and 41 of the first and second field windings 32 and 33 are connected to the positive electrode 21a of the capacitor 21. The capacitor 21 and the constant voltage diode 22 according to the third embodiment are connected in parallel to a full-wave rectifier (not shown); this full-wave rectifier works to full-wave rectify a voltage induced in the first armature winding 51. In addition, the battery 4 is connected in parallel to a full-wave rectifier (not shown); this full-wave rectifier works to full-wave rectify a voltage induced in the second armature winding 52.

The other end 40 of the first field winding 32 is connected to the positive terminal of the battery 4 via the transistor 141, and the other end of the second field winding 33 is connected to the positive terminal of the battery 4 via a transistor 141' equivalent to the transistor 141.

In the normal mode, the controller 145 (not shown in FIG. 10) drives the transistor 142 to continuously turn it on, and the controller 145 drives the transistors 141 and 141' to repetitively turn them on and off based on individually predetermined duty cycles, respectively. This allows the output voltages induced in the first and second armature windings 51 and 52 to be individually adjusted.

In the event of, for example, a transient voltage is generated in the armature windings 51 and 52 so that the output DC voltages of the first and second power generating unit G1 and G2 rapidly increase, respectively.

Because the monitor signal is continuously sent from the sensor 146 to the controller 145, the controller 145 detects the rapid increase in the output DC voltage of the tandem alternator 1B, thus rapidly driving each of the transistors 141, 141' and 142 to turn it off and keeping its off state. This allows the power supply from the battery 4 to the first and second field windings 32 and 33 to be interrupted.

The turning-off of each of the transistors 141, 141' and 142 allows a field current based on the magnetic energy stored in the first field winding 32 to flow therefrom to the one electrode 21a of the capacitor 21 via the diode 144 in a direction indicated by a dashed-dotted arrow AR1 illustrated in FIG. 10 so that the capacitor 21 is charged.

Similarly, the turning-off of each of the transistors 141, 141' and 142 allows a field current based on the magnetic energy stored in the second field winding 33 to flow therefrom to the one electrode 21a of the capacitor 21 via the diode 144 in a direction indicated by a double-dashed arrow AR2 illustrated in FIG. 10 so that the capacitor 21 is charged.

Thus, as well as the first embodiment, it is possible to rapidly demagnetize each of the field windings 32 and 33.

Seventh Embodiment

Figure 11:
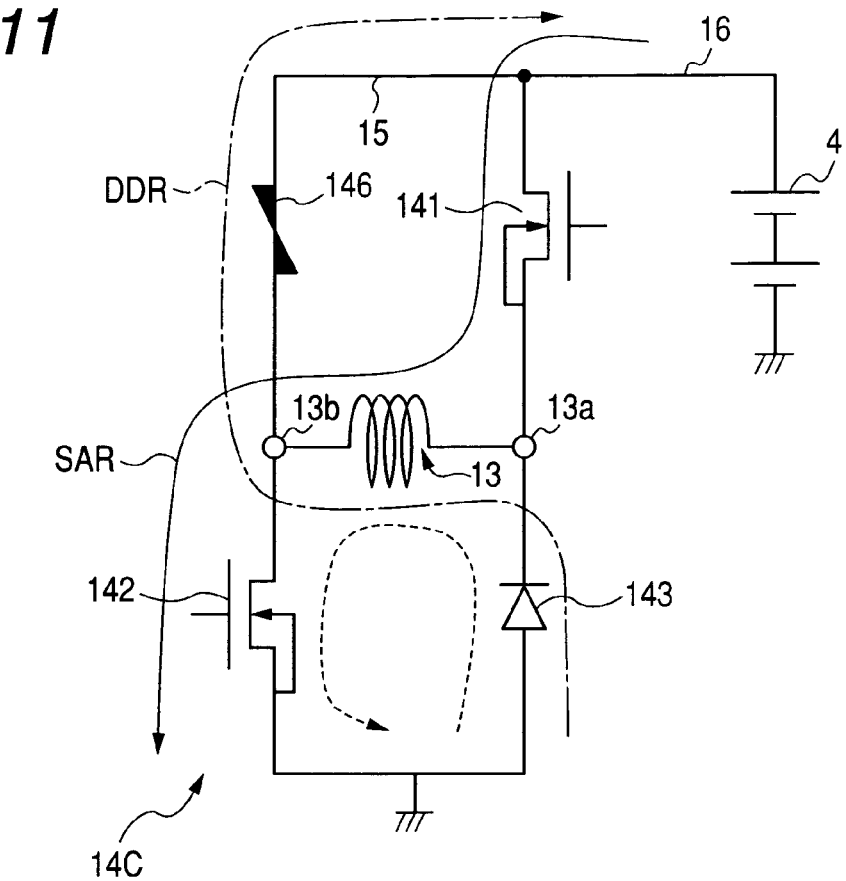
FIG. 11 is a circuit diagram schematically illustrating the structure of a field-current control circuit according to a seventh embodiment of the present invention.
Figure 12:
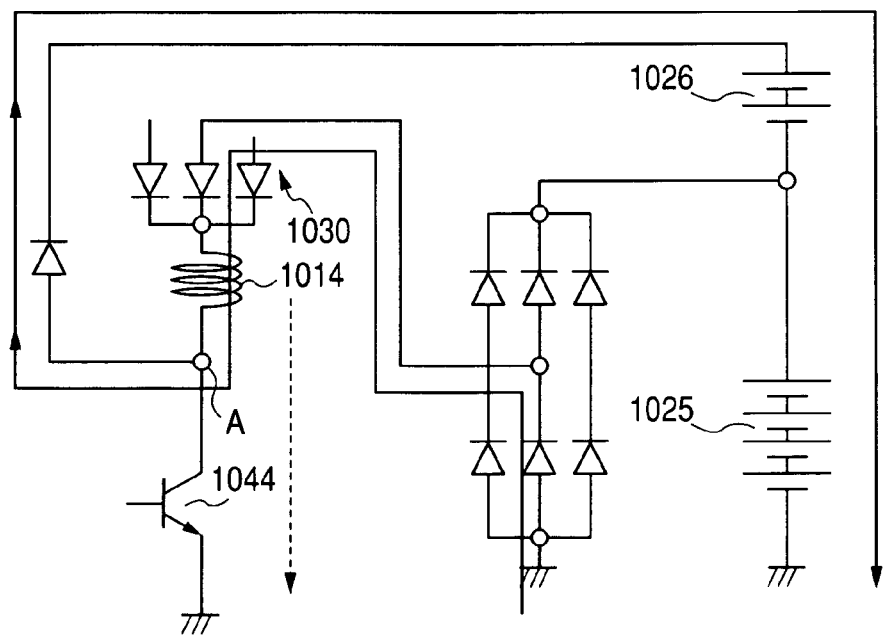
FIG. 12 is a circuit diagram schematically illustrating the structure of a conventional field-current control circuit.
Figure 13:
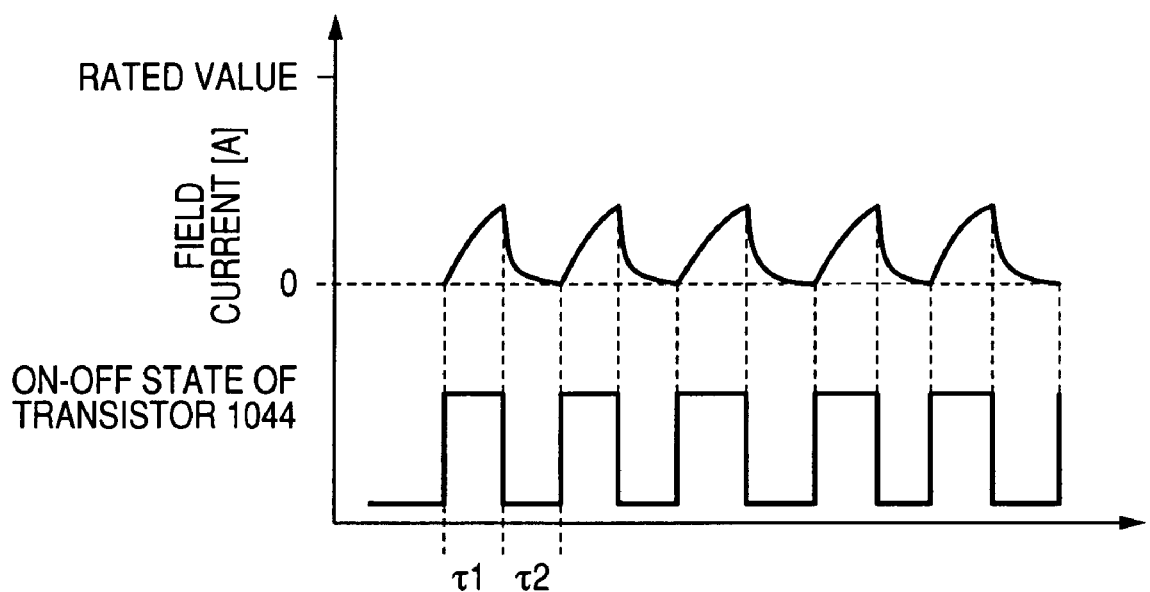
FIG. 13 is a timing chart schematically illustrating the waveform of a field current of a field winding illustrated in FIG. 12 when a field-current control circuit operates in a normal mode in which no load-damp voltage is generated.

FIG. 11 is a circuit diagram schematically illustrating the structure of a field-current control circuit according to a seventh embodiment of the present invention. Like parts between the first and seventh embodiments, to which like reference characters are assigned, are omitted or simplified in description.

As illustrated in FIG. 11, as compared with the structure of the field-current control circuit 14 illustrated in FIG. 2, in a field-current control circuit 14C, the diode 14 is replaced with a varistor (voltage variable resistor) 146. In addition, the capacitor 21 is omitted, and the other end 13b of the field winding 13 is connected to the positive terminal of the battery 4 via the varistor 146.

The varistor 146 has a very high resistance until a predetermined threshold voltage higher than the voltage at the positive terminal of the battery 4 by a predetermined voltage is applied across the variable resistor 146, and when a voltage higher than the predetermined threshold voltage is applied across the varistor 146, the resistance of the varistor 146 is rapidly dropped.

In the event of, for example, a disconnect between the alternator 1 and the battery 4, the transistors 141 and 142 are respectively turned off. The turning off of the transistor 142 allows the magnetic energy stored in the field winding 13 to serve as the first power source FP1 so that the potential at the other end 13b of the field winding 13 rises substantially.

When the potential at the other end 13b of the field winding 13 exceeds the predetermined threshold voltage, the resistance of the varistor 146 is rapidly dropped, so that a field current based on the first power source PS1 flows through the varistor 146 into the battery 4 while its voltage level drops.

Thus, at the other end 13B of the field winding 13, the sum of the drop voltage and the voltage of the battery 4 is applied to the field winding 13 as a reverse bias voltage; this reverse bias voltage causes the field current to be rapidly attenuated.

That is, in the seventh embodiment, the magnetic energy charged in the field winding 13 is distributedly attenuated by both the loss of the resistance R thereof and the loss of the voltage drop across the varistor 146, and thereafter the field current is supplied to the battery 4. Assuming that the battery 4 is regarded as a capacitor with a constant voltage, the magnetic energy stored in the field winding 13 becomes the sum of the loss of the resistance R thereof, the loss of the voltage drop across the varistor 146, and the charged voltage of the battery 4.

Specifically, even if the field current is rapidly damped, the remaining of the magnetic energy after consumed by the loss of the resistance R of the field winding 13 can be absorbed by the varistor 146 and the battery 4. Thus, it is possible to rapidly demagnetize the field winding 13.

The threshold resistance of the varistor 146 can be determined such that, in the normal mode of the field-current control circuit 14C, no current reciprocally flows through the varistor 146. This can prevent an undesired current from flowing through the varistor 146 in the normal mode of the field-current control circuit 14C.

The varistor 146 can be regarded as a bidirectional constant voltage diode having a voltage range within which the resistance is rapidly dropped. The bidirectional constant voltage diode can work to interrupt bidirectional currents therethrough when a voltage applied there across is equal to lower than the predetermined threshold voltage.

In each of the first to seventh embodiments, the diode 143 can be replaced with a transistor controlled to be turned on and off in complementary with the transistor 141, and the diode 144 can be replaced with a transistor controlled to be turned on and off in complementary with the transistor 142.

In each of the first to sixth embodiments, in the load damp mode, after a predetermined period of time has elapsed since the turning off of the transistor 145 at the time t=t1 so that the capacitor 21 (capacitor 2a or 5a) is fully charged, the controller 145 can drive the transistor 142 to turn it on. This makes it possible to accelerate the demagnetizing of the field winding 13.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A power-generator control apparatus for controlling a field current supplied from a battery to a field winding of a power generator, the field current generating a magnetic field, the magnetic field inducing power in an output winding of the power generator, the power-generator control apparatus comprising:
   a control circuit configured to intermittently control the supply of the field current from the battery to the field winding in normal mode so as to adjust the power induced in the output winding of the power generator, the control circuit being configured to interrupt the supply of the field current from the battery to the field winding in transient mode when a transient voltage occurs; and
   an energy absorbing circuit configured to absorb magnetic energy stored in the field winding independently of magnetic-energy consumption by a resistance of the field winding itself.

2. A power-generator control apparatus according to claim 1, wherein the control circuit comprises a first switching circuit connected between a positive terminal of the battery and one end of the field winding and configured to be turned on and off in the normal mode, the first switching circuit being configured to be turned off in the transient mode, and the energy absorbing circuit comprises:
   an electrical energy storage unit for storing therein electrical energy; and
   a second switching circuit for selectively connecting between the other end of the field winding and any one of a ground terminal and the electrical energy storage unit, the second switching circuit being configured to connect the other end of the field winding to the ground terminal in the normal mode and to connect the other end of the field winding to the electrical energy storage unit in the transient mode.

3. A power-generator control apparatus according to claim 2, wherein the first switching circuit comprises:
- a first transistor connected between the positive terminal of the battery and the one end of the field winding, the first transistor being configured to be turned on and off in the normal mode and configured to be turned off in the transient mode; and
- a first diode whose cathode is connected to the one end of the field winding and whose anode is grounded,
- and wherein the second switching circuit comprises:
- a second transistor connected between the other end of the field winding and the ground terminal, the second transistor being configured to be turned on in the normal mode and configured to be turned off in the transient mode; and
- a second diode whose cathode is connected to the electrical energy storage unit and whose anode is connected to the other end of the field winding.

4. A power-generator control apparatus according to claim 2, wherein the electrical energy storage unit comprises a capacitor.

5. A power-generator control apparatus according to claim 4, the capacitor is a smoothing capacitor connected between a pair of input terminals of a predetermined switching circuit.

6. A power-generator control apparatus according to claim 5, wherein the predetermined switching circuit is a DC to DC converter.

7. A power-generator control apparatus according to claim 5, wherein the predetermined switching circuit is an inverter for driving an AC motor.

8. A power-generator control apparatus according to claim 4, further comprising:
- a constant voltage diode connected in parallel to the capacitor.

9. A power-generator control apparatus according to claim 1, wherein the power generator is equipped with a full-wave rectifier composed of a plurality of constant voltage diodes connected in the form of a bridge, and the energy absorbing circuit is configured to apply, in the transient mode, a voltage based on the magnetic energy stored in the field winding to each of the plurality of constant voltage diodes so as to break down each of the plurality of constant voltage diodes.

10. A power-generator control apparatus according to claim 2, wherein the second switching circuit is configured to connect the other end of the field winding to the electrical energy storage unit in the transient mode, and, after a predetermined period of time has elapsed, to connect the other end of the field winding to the ground terminal.

11. A power-generator control apparatus according to claim 2, wherein the first switching circuit comprises:
- a first transistor connected between the positive terminal of the battery and the one end of the field winding, the first transistor being configured to be turned on and off in the normal mode and configured to be turned off in the transient mode; and
- a first diode whose cathode is connected to the one end of the field winding and whose anode is grounded,
- and wherein the second switching circuit comprises:
- a second transistor connected between the other end of the field winding and the ground terminal, the second transistor being configured to be turned on in the normal mode and configured to be turned off in the transient mode; and
- a varistor having one and the other ends, the one end of the varistor being connected to the positive terminal of the battery, the other end of the varistor being connected to the other end of the field winding.

12. A power-generator control apparatus according to claim 1, wherein the field winding is composed of a first field winding wire and a second field winding wire, the first switching circuit is composed of a pair of switching units, and the power generator is equipped with:
- a common rotary shaft;
- a first power generating unit composed of a first magnetic field core and the first field winding wire installed therein; and
- a second power generating unit composed of a second magnetic field core and the second field winding wire installed therein, the first and second magnetic field cores are attached tandem to the common rotary shaft,
- the other end of each of the first field winding wire and the second field winding wire is commonly connected to the second switching circuit, and the one ends of the first field winding wire and the second field winding wire are individually connected to the paired switching units, respectively.

* * * * *